Patented Sept. 5, 1939

2,171,555

UNITED STATES PATENT OFFICE 2,171,555

PROCESS TO MAKE ALPHA NAPHTHOL SOLUBLE IN WATER

Ferdinand Herb, Chicago, Ill., assignor to Arnold Joerns, Chicago, Ill.

No Drawing. Application September 20, 1937, Serial No. 164,798

4 Claims. (Cl. 167—32)

The present invention relates to the production of antiseptic solutions and more particularly to a process and composition produced thereby for making available the antiseptic qualities of alpha naphthol.

The principal purpose of the invention is to provide a solution of alpha naphthol that can be dissolved in water to give a clear solution.

To develop the antiseptic qualities inherent in otherwise insoluble substances such as alpha naphthol to their fullest extent, it is necessary to bring them into a condition that makes them soluble in water. Attempts to do so have been more or less successful before. For instance, soap has been used for the purpose. However, with alpha naphthol, the results are not very satisfactory.

If we add one gram of alpha naphthol (to make a 10% solution) to 6 cc. of fluid soap containing 2 grams of soap, we find that alpha naphthol does not dissolve at room temperature, but requires heat almost up to the boiling point to be dissolved. This solution is at first clear and transparent, but becomes thick and cloudy from a precipitate while cooling upon standing. A few drops of this mixture given into a test tube full of water do not dissolve but form a cloudy, muddy mixture. Soap, therefore, as such, is not able to make alpha naphthol soluble in water.

It is well known that alpha naphthol dissolves freely and rapidly in ethyl alcohol, isopropyl alcohol, acetone, chloroform and other similar substances. These solutions are clear and stable. However, when dropped into water, the solvent separates from the alpha naphthol, which latter collects on top of the water as a solid matter. Therefore, these solvents are not able to bring alpha naphthol into a solution in water.

For the sake of clearness, the product produced by alpha naphthol and its solvents is hereafter called "tincture". It represents an intermediary stage in the process to make the insoluble alpha naphthol soluble in water.

While, thus, neither of the two agencies above mentioned, i.e., the soap or the alcohol, is able to bring alpha naphthol into a clear tincture soluble in water, I will now show that the two combined synergetically can accomplish the desired end, provided the right concentrations and the right proportions are chosen. For instance, if potassium soap, say 2 grams, is dissolved in enough water to make 6 cc. and to this 6 cc. of soap solution are added 2 cc. of, say, isopropyl alcohol and, furthermore, 1 gram of alpha naphthol (to make a 10% solution), the resultant tincture gives a clear solution in water. However, any gross deviation downward from these concentrations and proportions impairs the solubility of the tincture in water and results in a more or less imperfect solution.

To illustrate, if the proportion of soap to alpha naphthol in the tincture is less than 2 to 1, that is, is less than 2 grams of soap (49% solids and 51% water), say only 1 gram or 1½ grams of soap to 1 gram alpha naphthol, the solubility of the alpha naphthol tincture in water decreases. The decrease in solubility is more marked when less soap is present. If more than 2 grams of soap are taken per gram of alpha naphthol, no advantage accrues as to the solubility of the alpha naphthol in water.

The same is true as to the proportions of the isopropyl alcohol. If only 1 cc. of the alcohol is added to the 6 cc. of the soap solution, the solubility of the alpha naphthol is not perfect. However, if 2 cc. are added, the alpha naphthol dissolved therein goes into a clear solution in water. If the percentage of alcohol in the tincture is raised, the solubility of alpha naphthol tincture in water does not increase, but the stability of the tincture does, as the greater percentage of water in the tincture, the greater is the liability and probability of precipitations while standing. From the standpoint of perfection, the highest percentage of the alcohol in the solvent is the best. As the soap contains approximately 50% of water, an amount of soap larger than the one needed for a perfect solution will increase the stability of the tincture rather than assist it and is, therefore, not desirable.

The solubility of alpha naphthol is considered perfect, if a layer of the tincture put upon the upper surface of distilled water in a test tube remains clear and transparent at the junction. If any white or whitish discoloration appears at this point or the whole layer of the tincture becomes turbid, the solubility of the alpha naphthol is not perfect.

From a practical standpoint, the different solvents belonging to this class of alcohols, acetone and chloroform, of their mixtures, are considered here equivalent.

Of potassium soaps only those are suitable for my purpose that give themselves a clear solution with water, as for instance corn oil soap. Those that do not give a clear solution with water, as for instance cocoanut soap, are not suitable.

It is to be understood that minor variations in the concentration of the alcohols and in the proportions of soap to alpha naphthol may be made without departing from the scope of the invention as defined in the claims. Also either ethyl alcohol or isopropyl alcohol or their mixtures with acetone or chloroform may be used as desired. The amount of alpha naphthol added depends upon the strength of solution desired. I have found a 10 to 15% solution to be sufficiently concentrated for my purposes. The solution or tincture when used is diluted with water as desired.

Having thus described my invention what I claim as new and desire to secure by Letters Patent is:

1. A concentrated solution containing alpha naphthol capable of being mixed with water to make a clear solution of alpha naphthol, said concentrated solution comprising potassium soap, some water, alpha naphthol, and alcohol, the proportion of soap to alpha naphthol being at least about 2 to 1 and the concentrated solution containing at least about 20% of alcohol by volume.

2. A concentrated solution containing alpha naphthol capable of being mixed with water to make a clear solution of alpha naphthol, said concentrated solution comprising potassium soap, some water, alpha naphthol, and at least one of the group of alcohols consisting of ethyl alcohol and isopropyl alcohol, the proportion of soap to alpha naphthol being at least about 2 to 1 and the concentrated solution containing at least about 20% of alcohol by volume.

3. A concentrated solution containing alpha naphthol capable of being mixed with water to make a clear solution of alpha naphthol, said concentrated solution comprising potassium soap, some water, alpha naphthol, and alcohol mixed with acetone or chloroform, the proportion of soap to alpha naphthol being at least about 2 to 1 and the concentrated solution containing at least about 20% of alcohol by volume.

4. A concentrated solution containing alpha naphthol capable of being mixed with water to make a clear solution of alpha naphthol, said concentrated solution comprising potassium soap, some water, alpha naphthol, and isopropyl alcohol, the proportion of soap to alpha naphthol being at least about 2 to 1 and the concentrated solution containing at least about 20% of alcohol by volume.

FERDINAND HERB.